US009888547B2

(12) United States Patent
Fischer et al.

(10) Patent No.: US 9,888,547 B2
(45) Date of Patent: Feb. 6, 2018

(54) CIRCUIT ASSEMBLY FOR OPERATING LIGHTING MEANS VIA A MASTER-SLAVE SYSTEM

(71) Applicant: Osram GmbH, München (DE)

(72) Inventors: Klaus Fischer, Friedberg (DE); Marco Antretter, Purfing (DE); Helmut Endres, Zusmarshausen (DE)

(73) Assignee: OSRAM-GMBH, Munich (DE)

( * ) Notice: Subject to any disclaimer, the term of this patent is extended or adjusted under 35 U.S.C. 154(b) by 0 days.

(21) Appl. No.: 15/125,941

(22) PCT Filed: Mar. 6, 2015

(86) PCT No.: PCT/EP2015/054721
§ 371 (c)(1),
(2) Date: Sep. 14, 2016

(87) PCT Pub. No.: WO2015/135848
PCT Pub. Date: Sep. 17, 2015

(65) Prior Publication Data
US 2017/0135184 A1    May 11, 2017

(30) Foreign Application Priority Data

Mar. 14, 2014  (DE) ........................ 10 2014 103 524

(51) Int. Cl.
*H05B 37/00*   (2006.01)
*H05B 37/02*   (2006.01)
(Continued)

(52) U.S. Cl.
CPC ..... *H05B 37/0254* (2013.01); *G06F 13/4068* (2013.01); *H04L 12/40019* (2013.01); *H05B 37/0218* (2013.01); *H05B 37/0227* (2013.01)

(58) Field of Classification Search
CPC ............ H05B 33/0854; H05B 37/0218; H05B 37/0227; H05B 37/0254; H05B 37/0272; Y02B 20/48
See application file for complete search history.

(56) References Cited

FOREIGN PATENT DOCUMENTS

AT           11444 U1    10/2010
DE    202005021023 U1    2/2007
(Continued)

OTHER PUBLICATIONS

PCT International Search Report of the International Searching Authority dated Aug. 10, 2015 for PCT/EP2015/054721, 5 pages.

*Primary Examiner* — Monica C King
(74) *Attorney, Agent, or Firm* — Fitch, Even, Tabin & Flannery LLP

(57) ABSTRACT

The invention relates to a circuit assembly for operating at least one lighting means, comprising at least one master device; at least one slave device; and a bus system having at least one bus, by means of which bus system the at least one master device and the at least one slave device are coupled; wherein the bus is designed as a two-wire cable, wherein the at least one master device has at least one feeding connection, which is coupled to the bus and is designed to place a control signal on the bus, wherein the at least one master device is coupled to a first voltage supply; wherein the at least one slave device comprises a non-feeding connection, which is coupled to the bus, wherein the slave device comprises a connection for at least one lighting means, a second voltage supply, and a read-out device for reading out the control signal on the bus, wherein the read-out device comprises a potential-isolating device and wherein the connection for the at least one lighting means and the second voltage supply are provided on the side of the read-out device isolated from the bus with regard to potential.

22 Claims, 5 Drawing Sheets

(51) Int. Cl.
*H04L 12/40* (2006.01)
*G06F 13/40* (2006.01)

(56) References Cited

FOREIGN PATENT DOCUMENTS

| | | |
|---|---|---|
| DE | 102007012054 A1 | 9/2007 |
| DE | 102009009535 A1 | 8/2010 |
| EP | 2645824 A1 | 10/2013 |
| GB | 2115240 A | 9/1983 |
| JP | H06269068 | 9/1994 |
| JP | H10241865 A | 9/1998 |
| NO | 2005025277 A1 | 3/2005 |

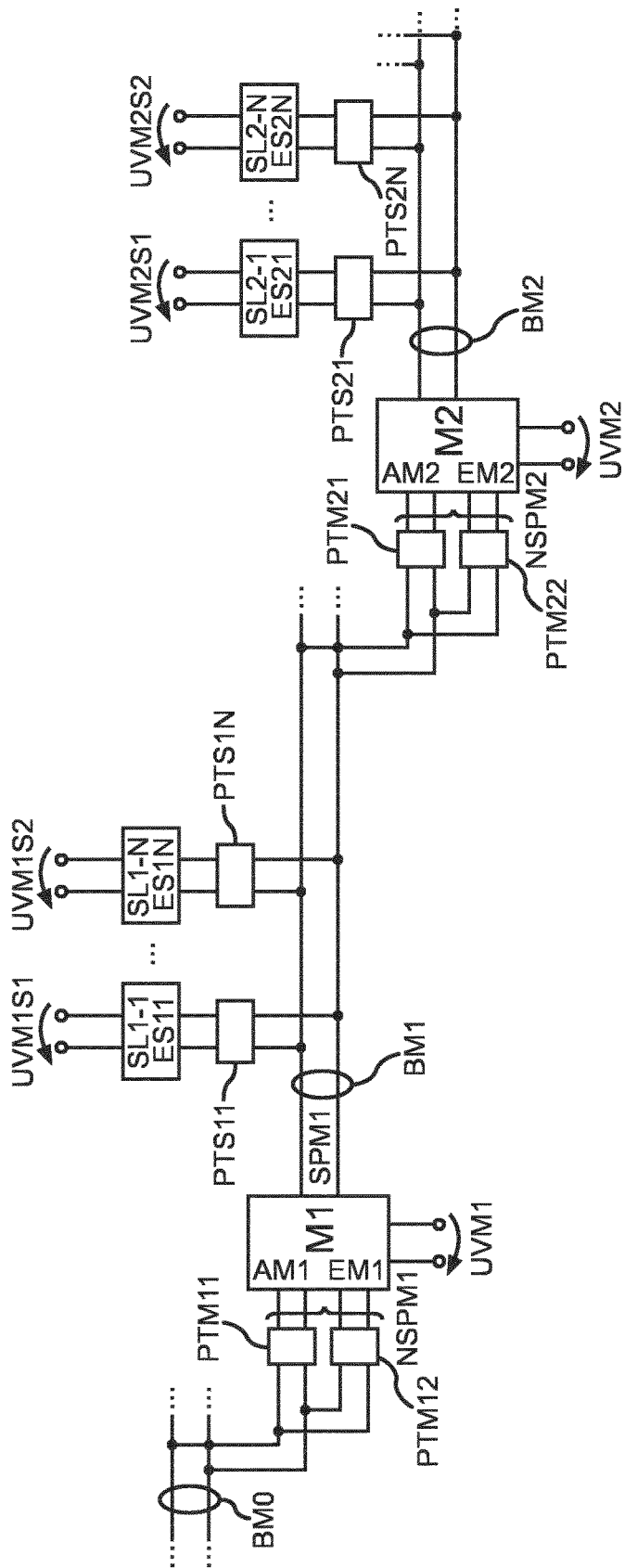

CIRCUIT ASSEMBLY FOR OPERATING LIGHTING MEANS VIA A MASTER-SLAVE SYSTEM

CROSS-REFERENCE TO RELATED APPLICATIONS

This application is a U.S. national phase application filed under 35 U.S.C. § 371 of International Application PCT/EP2015/054721, filed Mar. 6, 2015, designating the United States, which claims the benefit of German Patent Application filed Mar. 14, 2014, which is hereby incorporated herein by reference in its entirety.

FIELD

The present invention relates to a circuit assembly for operating at least one lighting means with at least one master device, at least one slave device and a bus system with at least one bus, to which the at least one master device and the at least one slave device are coupled.

BACKGROUND

Lamps or lighting means, also referred to as LE (=light engines) in the following, can include elements for automatization of lighting systems. They can for example be light sensors, which prevent turning on the LE with sufficiently large ambient brightness and automatically turn on this LE, respectively, if the ambient brightness falls below a presettable value. Furthermore, a motion sensor can also be integrated on an LE, which turns on the LE or varies the brightness thereof if a motion, for example a moving person, is detected in a target field.

In some cases of application, however, it can be reasonable to provide a relatively high number of lamps for reasons in terms of lighting, but not to provide sensors in each of these lamps. It is advantageous to install and provide sensors only in a part of the lamps, to remote control the other lamps from the lamp with sensor.

The present invention deals with the problem of describing a simple possibility, how control signals can be transmitted from a lamp with sensor, referred to as master in the following, to a lamp without sensor, referred to as slave in the following.

From the prior art, numerous bus systems or master-slave systems are known, for example under the designation I²C or DALI.

In this context, AT 11 444 U1 discloses an interface for a bus member of a lighting system, wherein the interface has a rectifier for rectifying the voltage of the bus line as well as means for potential isolation of the bus line, wherein the rectifier and the means for potential isolation are contained in an integrated interface.

GB 2 115 240 A discloses a control device for controlling the current, which is applied to a load from an alternating current supply, by phase control of an electrically triggerable switch, which is connected between load and current supply, wherein the control device includes a phase detector device for generating a succession of clock signals at respective points of time, at which the alternating current supply is at a preset point in its waveform.

Furthermore, DE 20 2005 021 023 U1 discloses a building installation system consisting of two different bus systems, which each have at least one bus apparatus, which are in communication with each other via a bus transfer module for the purpose of communication, adequate functional compliance and start-up, wherein incoming information of the first bus system is converted into transmittable commands of the second bus system and/or incoming information of the second bus system is converted into transmittable commands of the first bus system, wherein all of the bus apparatuses have such a construction that the bus apparatuses of the first bus system can only be employed as adapted bus apparatuses for use in the second bus system using an adapted physical layer.

From DE 10 2009 009 535 A1, a circuit for controlling an operating apparatus for a light application is known, including a galvanically separated transmitter, to which a control signal can be applied, and including a power part, which can be activated by the galvanically separated transmitter depending on the control signal.

However, these systems require a non-insignificant connection, installation and cost expenditure. Such a high complexity and functionality is not desired for simple applications for cost reasons.

Summary

Therefore, the object of the present invention is in developing a generic circuit assembly such that an inexpensive transmission of control signals from a master to at least one slave is allowed.

This object is solved by a circuit assembly having the features of claim 1.

The present invention is based on the realization that an inexpensive solution of the above object is allowed if the bus is designed as a simple two-wire line, to which the master device applies a control signal. The invention is further based on that the master device, in particular different master devices, as well as the at least one slave device, in particular different slave devices, can usually be coupled to the different phases of an alternating current network in non-predictable manner. Accordingly, if slave devices would be electrically conductively coupled to the bus for reading out the control signal applied by the master device without further provisions, thus, a short-circuit could occur with unfortunate choice of the voltage supply of the master and the voltage supply of the at least one slave, which not only prevents read-out of the control signal by the slave, but could destroy both components of the master and of the slave. This problem is avoided if the read-out is effected isolated in potential, that is galvanically separated. In this manner, master and slave can be coupled to the voltage supply in any manner without short-circuits or destruction of the corresponding circuits thereby having to be feared. The masters and the slaves can be connected to the alternating current network without further provisions.

According to the invention, as mentioned, the bus is therefore designed as a two-wire line. The master device has at least one feeding connection, which is coupled to the bus and adapted to apply a control signal to the bus, wherein the master device is coupled to a first voltage supply. The at least one slave device includes a non-feeding connection, which is coupled to the bus, wherein the slave device includes a connection for at least one lighting means, a second voltage supply as well as a read-out device for reading out the control signal on the bus. The read-out device in turn includes a potential isolating device, wherein the connection for the at least one lighting means as well as the second voltage supply are provided on the side of the read-out device isolated in potential from the bus.

In a preferred embodiment, the master device also includes a non-feeding connection, which can be coupled to a further bus, wherein the master device includes a connection for at least one lighting means as well as a read-out device for reading out the control signal on the further bus, wherein the read-out device includes a potential isolating device and the connection for the at least one lighting means is provided on the side of the read-out device isolated in potential from the further bus. By this measure, there is basically provided the possibility that the master device can read out a control signal from a further bus. In particular, this becomes particularly relevant, as is explained in more detail below, if a second master device is coupled to the bus, to which the first master device is coupled with its feeding connection.

In this context, it is particularly preferred if the non-feeding connection of the master device further has a short-circuit device, which can be coupled to the further bus, wherein the short-circuit device includes a control input for applying a short-circuit signal and is adapted to short-circuit the two lines of the further bus upon applying a short-circuit signal to its control input, wherein the short-circuit device includes a potential isolating device for isolating the potential of the control input from the potential of the further bus. In this manner, a master device, which is only coupled to a bus with its non-feeding connection, can override, that is cancel, the control signal of the master device, which is coupled to the bus with its feeding connection. In this manner, the basis is provided that multiple master devices, which preferably are each coupled to at least one slave device via their feeding connection, can cooperate, wherein only one master device is always coupled to each one bus of the bus system with its feeding connection, but multiple master devices can be coupled thereto with their non-feeding connections. Thereby, the master devices coupled with their non-feeding connections can determine the potential and thereby the control signal on the bus and thereby control the master device, which is connected to this bus with its feeding connection, as well as the slave devices coupled to this bus.

Therefore, in an embodiment, the circuit assembly includes at least a first and a second bus, at least a first and a second master device with respectively a feeding connection and a non-feeding connection, wherein at least the feeding connection of the first master device is coupled to the first bus, wherein the feeding connection of the second master device is coupled to the second bus, wherein the non-feeding connection of the second master device is coupled to the first bus. In this constellation, the second master device can influence the potential and thereby the control signal on the first bus via its non-feeding connection, which is actually fed by the first master device. In a specific example of application, one can imagine a long corridor, at the one end of which the first master device is positioned and at the opposing end of which the second master device is positioned. A plurality of slave devices associated with the first master device are disposed distributed between the first and the second master device and are coupled to the first bus isolated in potential. Both master devices are equipped with a motion sensor. If the first master device now does not detect any motion and thereby keeps the lighting means coupled to it as well as the lighting means coupled to the associated slave devices in an idle state, for example turned off or dimmed by corresponding control by applying a corresponding control signal, the second master device, if it detects a motion, can override this turn-off signal and thereby activate itself, i.e. its own lighting means, the lighting means of the first master device as well as the lighting means of the slave devices coupled to the first bus.

In this manner, thus, multiple master-slave systems according to the invention can be connected to each other, for example to control the lighting in sections in a long corridor.

Preferably, the respective potential isolating device includes an optical coupler. If a transmitter would be used instead, the control signal would have to be present as an AC signal. In using an optical coupler, in contrast, a DC signal can be transmitted in inexpensive and simple manner. EMV problems can be reliably prevented. The optical coupler preferably includes an emitting diode and a phototransistor, wherein a current limiting device, in particular an ohmic resistance, is coupled in series with the emitting diode. This current limiting device is in particular advantageous if the forward voltages of multiple read-out devices connected to the bus are differently sized. By the current limitation, it can be ensured that approximately the same current flows in all of the emitting diodes connected to the bus. This ensures reliable function of the optical couplers or the read-out devices connected to the bus independently on the number thereof.

Preferably, the feeding connection of a master device includes a first current limiting device, which is disposed between the plus terminal of its voltage supply and the bus or between the minus terminal of its voltage supply and the bus. By this current limiting device, it can be ensured that the non-feeding connection of another master device connected to the bus can harmlessly short-circuit the bus voltage to override, i.e. deactivate, the control signal of the master device, which is coupled to the bus with its feeding connection. The current limiting device also contributes to the fact that the lighting means are not damaged even in case of a false connection.

In order to allow protection of the bus against false connection, for example inadvertently coupling the supply voltage to the bus or connecting two feeding connections of two masters, it can be provided that the feeding connection of a master device includes a first diode and a second diode, wherein the first diode is coupled between a first connection of its voltage supply and a first line of the bus and the second diode between a second connection of its voltage supply and a second line of the bus, wherein the first and the second diode are arranged anti-parallel.

For further improving the circuit assembly, the feeding connection of a master device can include a second current limiting device, wherein one of the current limiting devices is disposed between the minus terminal of its voltage supply and the bus and the other current limiting device is disposed between the plus terminal of its voltage supply and the bus. By this measure, it is achieved that the connected master and slave devices are not damaged even in case of an inadvertent connection of the mains voltage to the bus connections.

According to a preferred development, the non-feeding connection includes a rectifier, which is disposed on the side of the potential isolating device coupled to the bus for rectifying the control signal on the bus. In this manner, transmission can occur with one and the same optical coupler independently of the polarity of the control signal on the bus.

Preferably, the non-feeding connection includes an evaluation device, which is adapted to evaluate the control signal on the bus, to which the non-feeding connection is coupled, the input of which is coupled to the phototransistor of the optical coupler of the respective potential isolating device and the output of which is coupled to the respective lighting means, wherein the control signal represents a PWM signal. In this manner, the evaluation device is provided isolated in potential from the bus, wherein the possibility is provided to adjust different operating states of the lighting means coupled to the non-feeding connections by variation of the PWM signal.

In this context, it is particularly advantageous if the evaluation device is adapted to convert the PWM signal as follows: A bus-controlled operation of the respective lighting means with nominal power or a nominal light flux is activated by a PWM signal with 0% pulse width and/or a bus-controlled off-state of the respective lighting means is activated by a PWM signal with a smallest allowable pulse width and/or bus-controlled operating modes with dimming stages between the off-state and the nominal power or the nominal light flux are activated by a PWM signal with pulse widths greater than the smallest allowable pulse width, in particular also by a PWM signal with 100% pulse width. By this convention, various advantages arise: In that a nominal operation is activated by a PWM signal with 0% pulse width, that is a voltage is not applied between the bus lines, it is allowed that the slave devices operate with nominal power or nominal light flux in case that they are not connected to a bus. In that a PWM signal with a smallest allowable pulse width is stipulated for a bus-controlled off-state of the respective lighting means, standby losses are optimally minimized. By the convention that bus-controlled operating modes with various dimming stages can be activated by a PWM signal with pulse widths larger than the smallest allowable pulse width, a particularly high efficiency arises since the power supplied to the lighting means can for example be made dependent on the ambient brightness. Here, a dimming stage fixedly stored in the master and in the slave devices, respectively, can also for example be activated in particularly simple manner by a PWM signal with 100% duty cycle, which corresponds to a direct voltage signal.

Preferably, the at least one master device includes a sensor, in particular a brightness sensor and/or a motion sensor, which is adapted to provide a sensor signal at its output, wherein the at least one master device is adapted to generate the control signal depending on the sensor signal. In other words, only the respective master devices have to be provided with a sensor, which then can control the slave devices connected thereto or even further master devices (also via the non-feeding input thereof) corresponding to the sensor signal.

Further preferred embodiments are apparent from the dependent claims.

BRIEF DESCRIPTION OF THE DRAWINGS

In the following, embodiments of the present invention are now described in more detail with reference to the attached drawings. They show:

FIG. 1 in schematic view an embodiment of the present invention;

DETAILED DESCRIPTION

Figure 2A:
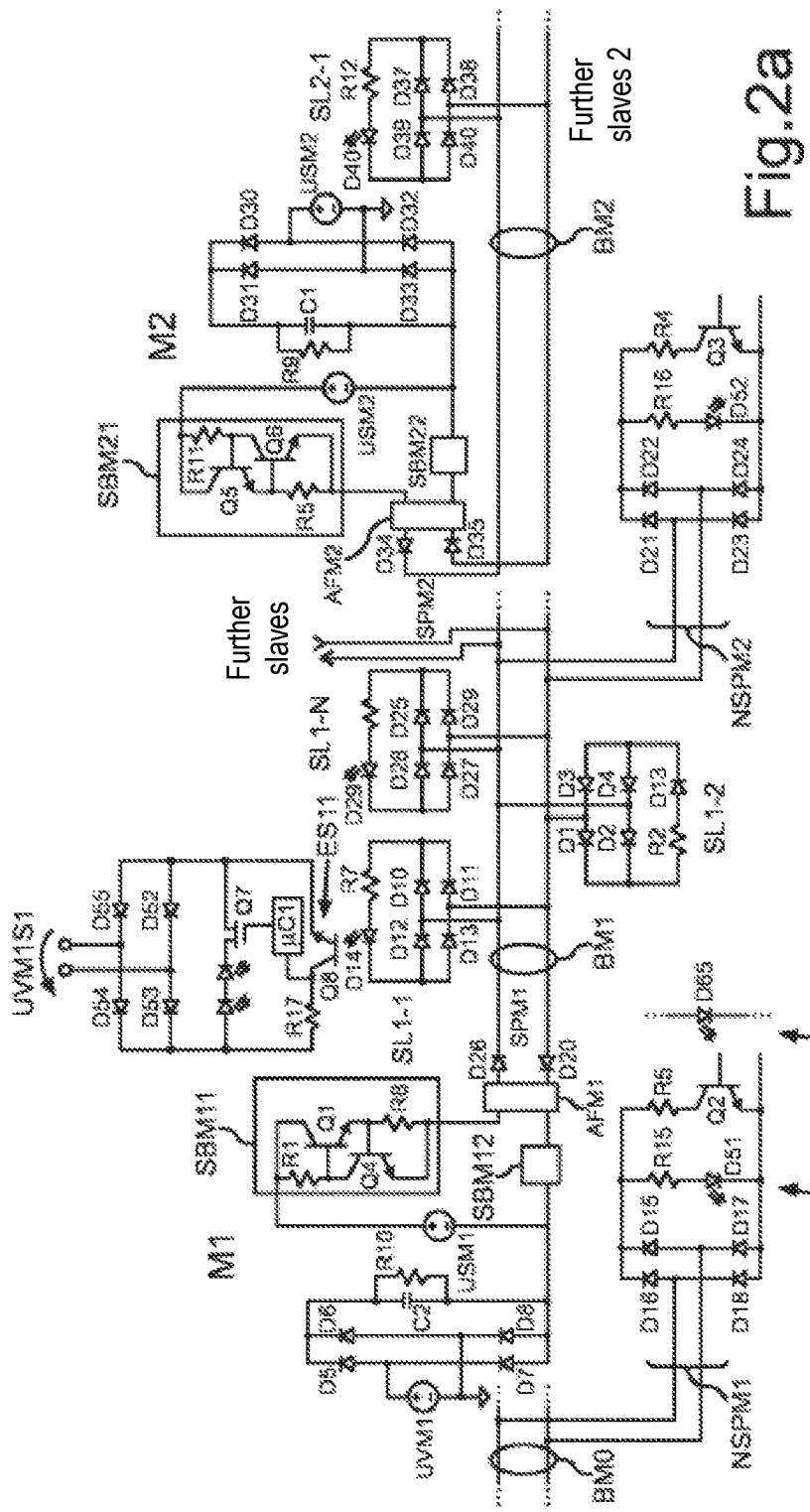
FIG. 2 a more detailed representation of the embodiment of FIG. 1.

In the following, the same reference characters are used for identical and identically acting components. They are introduced only once for the sake of clarity.

FIG. 1 shows an embodiment of a circuit assembly according to the invention in schematic representation. It includes a first master M1 as well as a second master M2. The master M1 includes a feeding connection SPM1, which is adapted to apply a control signal to a bus BM1. The master M1 furthermore includes a non-feeding connection NSPM1, which is coupled to a bus BM0. A potential isolating device PTM11 is provided between the bus BM0 and an input EM1 of the master M1. A potential isolating device PTM12 is provided between the bus BM0 and an output AM1 of the master M1. The master M1 is connected to a supply voltage UVM1, which can represent an alternating voltage source, for example a mains voltage. Multiple slaves SL1-1 and SL1-N are associated with the master M1 via the bus BM1, wherein N represents a natural number. They also have a non-feeding connection, which is coupled to the bus BM1 respectively via a potential isolating device PTS1-1 and PTS1-N, respectively.

Each slave SL1-1, SL1-N is coupled to the respective potential isolating device PTS11 and PTS1N, respectively, via a corresponding input ES11 and ES1N, respectively. The slave SL1-1 is coupled to a voltage source UVM1S1, the slave SL1-N is coupled to a voltage source UVM1 S2.

The master M2 is fed from a voltage source UVM2. Its non-feeding connection NSPM2 includes an input EM2 on the one hand as well as an output AM2 on the other hand and is coupled to the bus BM1. The corresponding potential isolating devices are denoted by PTM21 and PTM22. The master M2 controls the bus BM2 with its feeding connection SPM2. A slave SL21 is coupled to the bus BM2 with its input E21 via a potential isolating device PTS21. This slave SL2-1 is supplied from a voltage supply UVM2S1. A slave SL2-N is coupled to the bus BM2 with its input E2N via a potential isolating device PTS2N. This slave SL2-N is fed from a voltage supply UVM2SN.

The mentioned voltage supplies can be coupled to an alternating voltage network in any manner, i.e. with any phases.

The slaves connected to the respective busses BM1 and BM2 can only read out the voltage or voltage waveform on the respective bus and correspondingly adjust their operating manner. In this overview representation, neither sensors of the masters M1, M2 nor the lighting means thereof, nor the lighting means of the slaves are drawn. How they are to be supplied within the respective device (slave or master) from a voltage supply is sufficiently known to the expert, but is exemplarily explained in more detail in connection with FIG. 2.

In order to allow an operation as a so-called multi-master system, each master M1, M2 has a non-feeding connection, which is connected to the corresponding bus BM1 and BM2, respectively. Via this, the master M1, M2 can query the voltage signal of the bus in the same manner as slaves, but additionally also vary the signal.

By the structure shown in FIG. 1, it can be achieved that a series of lighting means consisting of two masters and N slaves can be controlled by the master M1 via the feeding connection thereof and the master M2 can also influence the operation of the assembly via the non-feeding connection NSPM2 thereof.

Thus, each master M1, M2 can query the voltage signal of a further bus via its non-feeding connection NSPM1 and NSPM2, respectively, in the same manner as the slaves, to which it is connected via its non-feeding connection. Thus, presently, the non-feeding connection NSPM1 of the master M1 is coupled to a bus BM0, the non-feeding connection NSPM2 of the master M2 is coupled to the bus BM1. Then, via the diode section in the optical coupler of the non-feeding master connection, only the state of the "adjacent bus" is queried. The query of the "own bus", which is connected to the feeding connection, can be effected in two ways: First, as illustrated in connection with FIG. 2a on the example of the master M1 in the following, without optical coupler directly in the feeding connection by a query device AFM1, which includes a voltage sensor, via which the master M1 can recognize that the master M2 short-circuits the bus BM1. Secondly, via a non illustrated structure as in the non-feeding connection, but which is connected to the bus BM1 internal to apparatus.

Figure 2B:
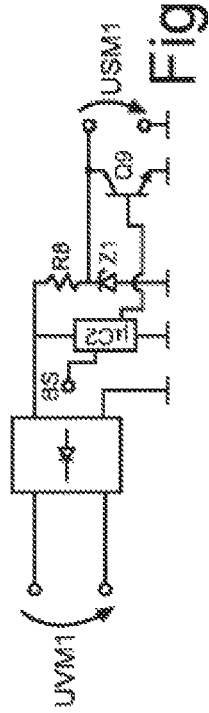

FIG. 2a shows a circuit-wise realization of the embodiment schematically illustrated in FIG. 1 of a circuit assembly according to the invention. As is apparent, the circuit-wise idea consists in that the feeding connection of a first master M1 is designed not isolated in potential, but all of the other connections, thus those of the slaves SL1-1, SL1-2, SL1-N and the non-feeding connection NSPM2 of a second master M2 are connected to the bus BM1 only via potential isolating devices, for example optical couplers.

In the following explanations, the construction and the mode of operation of certain elements of the circuit assembly according to the invention are exemplarily explained on certain modules. As is obvious to the expert, corresponding modules of other elements of the same category (slaves, masters, etc.) are correspondingly constructed.

A Circuit Example for a Non-Feeding Connection:

The control signals applied to the input of the non-feeding connections, NSPM1 at the master M1, ES11 at the slave SL1-1, NSPM2 at the master M2, are rectified, whereby the corresponding busses BM1 and BM0, respectively, are protected against polarity reversal. For rectifying, there serve the diodes D15 to D18 in the master M1, the diodes D9 to D12 in the slave SL1-1 and the diodes D21 to D24 in the master M2. An optical coupler including an emitting diode and a phototransistor respectively serves for read-out. The emitting diode is denoted by D51 in the master M1, the phototransistor is not illustrated for the sake of clarity. The emitting diode is denoted by D14 at the slave SL1-1, the phototransistor by Q8. In the master M2, the emitting diode is denoted by D52, the phototransistor is again not illustrated.

The respective emitting diode is applied to the output of the corresponding rectifier correct in polarity in series with a current limiter, which can for example be constituted by a resistor (R15 at the master M1, R7 at the slave SL1-1, R16 at the master M2). The LE, presently illustrated on the example of the slave SL1-1 by two light emitting diodes, can thereby evaluate the control signal USM1 applied to the bus BM1 via the phototransistor Q8 of the optical coupler in potential-free manner. Thereto, the supply voltage UVM1S1 of the slave SL1-1 is rectified by means of the diodes D52 to D55 and applied to the series connection of an ohmic resistor R17 and the phototransistor Q8. The potential on the collector of the transistor Q8 is supplied to a microprocessor µC1, which controls a transistor Q7 serially coupled to the LEs between the outputs of the rectifier D52 to D55.

A circuit extension for a non-feeding master connection, for example the connection NSPM1 of the master M1 allows the master M1 also being able to short-circuit the bus voltage of an "adjacent bus". Thereto, a short-circuit device is further coupled to the output of the rectifier D15 to D17, which includes the series connection of an optional ohmic resistor R4 as well as a transistor Q2. The transistor Q2 is formed as a phototransistor and cooperates with an emitting diode D65. With suitable control of the emitting diode D65, it short-circuits the phototransistor Q2 and thereby applies a short-circuit signal to the "adjacent bus", presently the bus BM0.

In order to recognize that the master M2 applies a short-circuit signal to the bus BM1, a query device AFM1 is provided in the master M1, which includes a voltage sensor, via which the master M1 can recognize if the master M2 short-circuits the bus BM1.

The feeding connection SPM1 of the master M1 contains a current limiter SBM11 as well as two diodes D26 and D20. By the current limiter SBM11, it can be ensured that the non-feeding connection NSPM2 of another master M2 connected to the bus BM1 can short-circuit the bus voltage without destroying the components of the master M1. In addition, the current limiter SBM11 and the two diodes D20, D26 contribute to the fact that LEs are not damaged even in case of false connection. An erroneous connection would for example be present if the respectively feeding connections SPM1 of the master M1 and SPM2 of the master M2 would inadvertently be connected to the same bus line BM1.

The voltage supply of the master M1 is realized in that a rectifier, which includes the diodes D5 to D8, is applied to an alternating voltage source UVM1, for example a mains voltage. At the output of the rectifier D5 to D8, a rectified alternating voltage is provided, which is smoothed by means of a parallel connection including a capacitor C2 and an ohmic resistor R10. This rectified alternating voltage serves for operating the components of the master M1 on the one hand, in particular also the LE thereof not illustrated. As is apparent form FIG. 2b, the control signal USM1 is also obtained from the voltage UVM1, which presently represents a PWM signal with a level between 0 V and 10 V. Thereto, the rectified alternating voltage UVM1 is supplied to the series connection of an ohmic resistor R18 and a Zener diode Z1, wherein en electronic switch, in this case the bipolar transistor Q9, is connected in parallel with the Zener diode. The base thereof is coupled to the output of a microprocessor µC2, which is also supplied by the rectifier D5 to D8. The microprocessor µC2 has an input BS, via which a control signal, for example of a brightness sensor or a motion sensor, is supplied to it. The microprocessor µC2 is formed to control the transistor Q9 depending on the signal BS. This is described in more detail below with reference to FIG. 5.

The voltage limiter SBM11 connected in series with the control signal USM1 includes the transistors Q1 and Q4 as well as the ohmic resistors R1 and R8. Therein, the ohmic resistor R1 is coupled between the collector and the base of the transistor Q1, the ohmic resistor R8 between the base and the emitter of the transistor Q4. The base of the transistor Q4 is coupled to the emitter of the transistor Q1 and the collector of the transistor Q4 is coupled to the base of the transistor Q1.

A further current limiting device SBM12 is coupled between the minus terminal of the voltage source USM1 and the bus BM1. By this measure, it is achieved that the apparatuses connected to the bus are not damaged even in case of an inadvertent connection of the mains voltage UVM1 to the bus connections.

Figure 3:
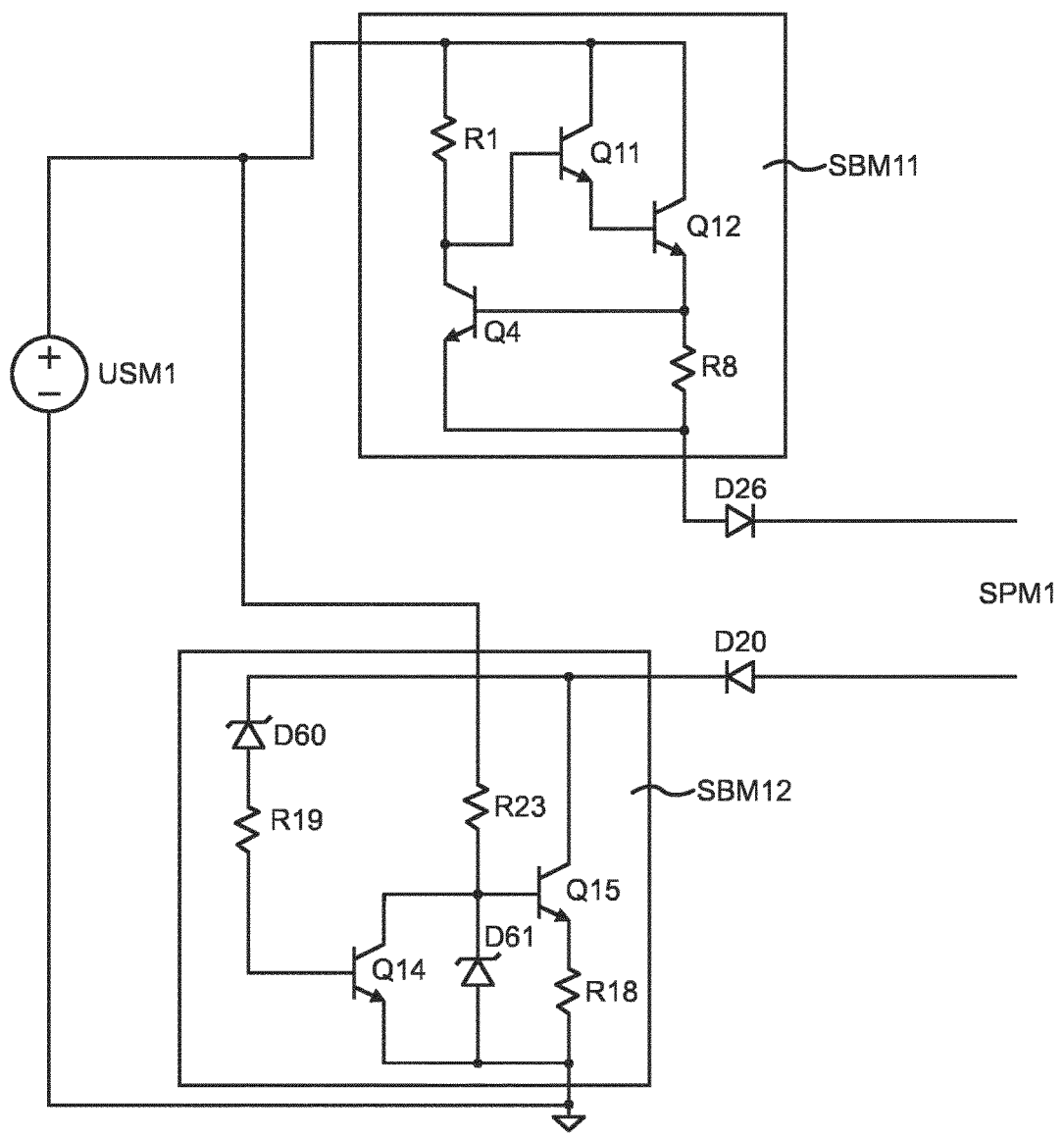
FIG. 3 an embodiment of a feeding circuit with two current limiting devices.

FIG. 3 shows a more detailed representation or a modification of a section from FIG. 2a, namely the current limiting devices of the master M1. The current limiting device SBM11 corresponds to that shown in FIG. 2a, wherein only the transistor Q1 is formed as a Darlington stage. The current limiting device SBM12 includes the series connection of a transistor Q15 and an ohmic resistor R18, which are coupled between a bus line and the reference potential. A diode D61 is coupled between the base of the transistor Q15 and the reference potential. The collector-emitter section of a transistor Q14 is connected in parallel with the diode D61, the base of which is coupled to a bus line via the series connection of an ohmic resistor R19 and a diode D60. The base of the transistor Q15 is coupled to the plus terminal of the voltage source USM1 via an ohmic resistor R23.

Figure 4:
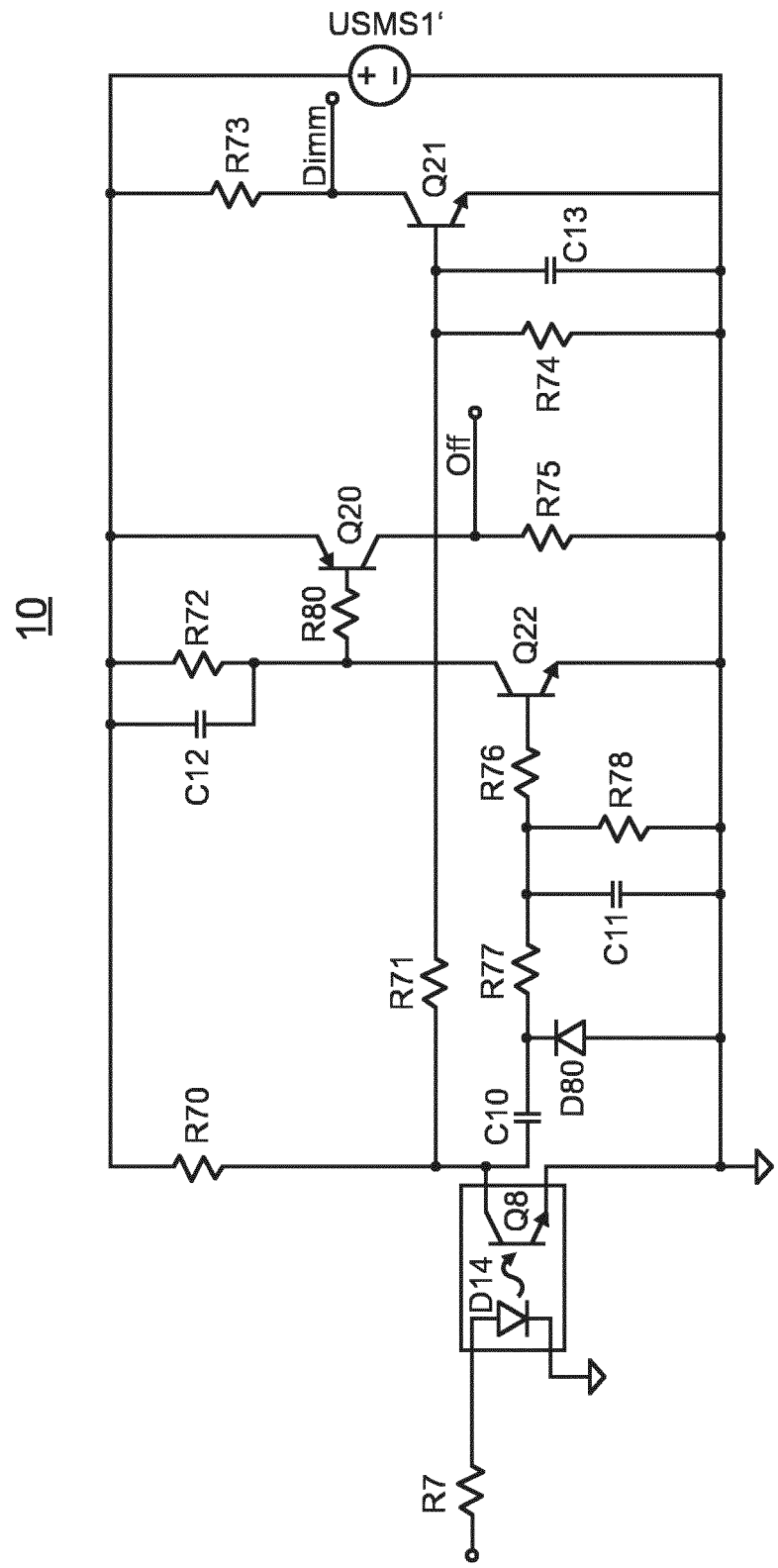
FIG. 4 an embodiment of an analog evaluation device.

While the evaluation circuit is illustrated in FIG. 2 in digital form by means of the microprocessor μC1 on the example of the slave SL1-1, FIG. 4 shows an analog evaluation circuit on the example of the slave SL1-1, which converts different PWM signals such that certain states in the LEs are activated. Such an evaluation circuit 10 can be used in all of the slaves and for the non-feeding connections of the masters M1, M2, respectively.

On the input side, this evaluation circuit 10 is coupled to the bus BM1 via an optical coupler including the emitting diode D14 and the phototransistor Q8. For supplying this evaluation circuit 10, a direct voltage UVMS1' is derived from the supply voltage UVM1S1 of the slave SL1-1, which usually represents the mains voltage, which is 10 V in the embodiment. Between the terminals of the voltage source UVMS1', the series connection of an ohmic resistor R43 and a transistor Q21 is coupled. The parallel connection of an ohmic resistor R74 and a capacitor C13 is connected in parallel with the base-emitter section of the transistor Q21. The base terminal of the transistor Q21 is coupled to the collector of the phototransistor Q8 via an ohmic resistor R71. An ohmic resistor R70 is coupled between the collector of the phototransistor Q8 and the voltage source UVMS1'.

The series connection of a transistor Q20 and an ohmic resistor R75 is coupled between the terminals of the voltage source UVMS1'. The base of the transistor Q21 is coupled to the plus terminal of the voltage source UVMS1' via the parallel connection of a capacitor C12 and an ohmic resistor R72 on the one hand. On the other hand, this base is coupled to the minus terminal of the voltage source UVMS1' via a transistor Q22. The base of the transistor Q22 is coupled to the collector of the phototransistor Q8, namely via the series connection of a capacitor C10, an ohmic resistor R77 and an ohmic resistor R76, wherein the point of connection between the capacitor C10 and the ohmic resistor R77 is coupled to the minus terminal of the voltage source UVMS1' via a diode D80 and the point of connection between the ohmic resistors R77 and R76 via the parallel connection of a capacitor C11 and an ohmic resistor R78.

To the mode of operation: As is apparent from the representation, an off output is formed by the emitter of the transistor Q20 and a dimming output is formed by the collector of the transistor Q21. The following important states arise:

1. A 0 V signal, i.e. a PWM signal with a duty cycle of 0% or a non-connected input, results in the fact that the base of the transistor Q21 obtains a sufficiently high voltage via the ohmic resistors R70 and R71 and the collector-emitter voltage $U_{CE}$ of the transistor Q21 approaches 0 V, whereby the signal "Dimm" approaches 0 V (low).

In contrast, the base of the transistor Q22 remains at 0 V due to the capacitor C10. Possible voltage peaks upon switching are greatly attenuated by the capacitor C11 and the ohmic resistors R78 and R77. Thereby, the base of the transistor Q20 further remains at the potential of UVMS1 via the ohmic resistor R72, whereby the signal "Off" remains further at 0 V (low) via the ohmic resistor R75.

2. A PWM signal with the smallest allowable magnitude at the input of the optical coupler results in an inverted PWM signal with very high duty cycle at the collector of the transistor Q8. This results in a sufficiently high signal level at the transistor Q22 via the high-pass of the ohmic resistors R77 and R78 as well as the capacitor C10. By the ohmic resistor R76, the current into the base of the transistor Q22 is further limited. The capacitor C11 ensures buffering the signal and acts as a low-pass together with the ohmic resistor R77. The capacitor C11 is discharged in a defined time in other operating states via the ohmic resistor R78. The diode D80 ensures that the capacitor C11 is not considerably discharged during the short ON time at the input of the optical coupler (0 V at the collector of the transistor Q8), but current can then flow in the circuit D80, C10 and Q8. The capacitor C11 and the ohmic resistor R78 act as an additional low-pass for varying signal states at the base of the transistor Q20, which is pulled towards 0 V across the transistor Q22 in this state. Thereby, the signal "OFF" assumes nearly the potential of UVMS1 (high) The ohmic resistor R80 limits the current by the base of the transistor Q20.

3. A PWM signal with nearly 100% duty cycle or a DC voltage at the input of the optical coupler results in the fact that the collector-emitter voltage $U_{CE}$ of the transistor Q8 becomes nearly 0 V and thereby the base of the transistor Q21 is also pulled to 0 V. Thereby, the signal "Dimm" is raised to UVMS1 (high) via the ohmic resistor R73. The network of the ohmic resistors R71, R74 and the capacitor C13 acts as a low-pass for possible voltage peaks at the same time.

The base of the transistor Q22 is at 0 V via the ohmic resistor R78 in this state, which thus keeps the base of the transistor Q20 at the potential of UVMS1 via the ohmic resistor R72. Thereby, the signal "Off" remains at 0 V (low) via the ohmic resistor R75.

Figure 5:
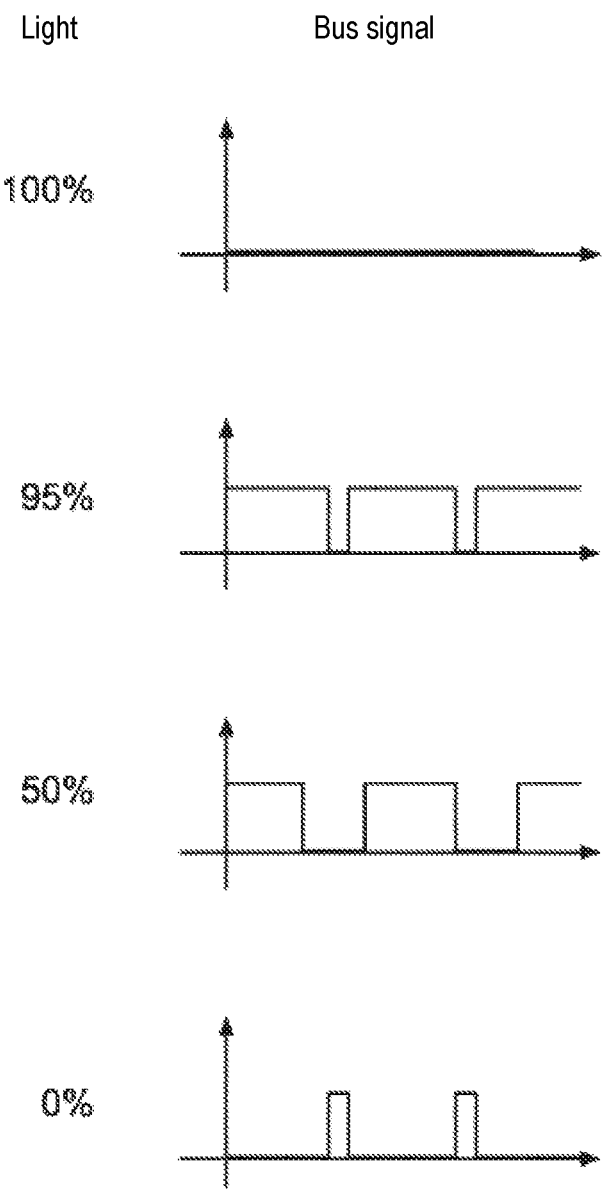
FIG. 5 examples for control signals for adjusting different light fluxes in a circuit assembly according to the invention.

The following table shows the behavior of the evaluation circuit 10 of FIG. 4 in synopsis with FIG. 5:

| PWM pulse widths on bus line | Signal at the node "Off" | Signal at the node "Dimm" | Operating state of the LE |
| --- | --- | --- | --- |
| 0% | low | low | nominal power |
| smallest allowable magnitude | high | not defined | off state |
| 100% | low | high | dimming state |

Accordingly, a PWM pulse width on the bus line BM1 of 0%, that is a short-circuit between the two bus lines, results in a low signal at the node Off and a low signal at the node Dimm. Thereby, the respective LE is operated with nominal power. If a PWM signal with the smallest allowable pulse width is input to the bus line, a signal high arises at the node Off, a non-defined signal at the node Dimm, which results in the off state of the LE. In contrast, if a direct voltage signal, that is a PWM signal with a pulse width of 100%, is applied to the bus line, a low signal arises at the node Off, a high signal at the node Dimm, whereby the LE is operated in a preset dimming state.

Besides these three operating states, FIG. 5 exemplarily shows a further operating state, in which a PWM signal with a pulse width of 95% is applied to the bus line, which results in a further dimming state, which can be darker or brighter than the dimming state according to convention, which results at a PWM pulse width of 100%.

From the architecture according to FIG. 5, the following advantageous mode of operation of the master-slave system according to FIG. 2 results:

It is determined that the bus-controlled operation of the slaves and the masters, which are connected to the same bus line via their non-feeding connection, is activated with nominal power or nominal light flux in that a PWM signal with 0% bus width is applied to the bus line. Thereby, it is no voltage between the bus lines. Thereby, it is allowed that the slaves operate with nominal power (or nominal light flux), in the case that they are not connected to a bus.

To minimize standby losses, it is further determined that the bus-controlled off state of the slaves and the masters, which are connected to the same bus line via their non-feeding connection, is activated in that a PWM signal with the smallest allowable pulse width is applied to the bus line.

Further bus-controlled operating modes of the slaves and the masters, which are connected to the same bus line via their non-feeding connection, are activated by PWM signals with larger pulse widths than the smallest allowable pulse width. For example, a dimming stage fixedly preset in the masters and slaves can be particularly simply activated by a PWM signal with 100% duty cycle (corresponds to a direct voltage signal).

This determination of the operating states allows the following modes of operation:

In case of a detected motion, each master, which is connected to a bus line with its feeding or non-feeding connection, can set all of the connected LEs to the nominal operating state.

Thereto, the master, which is connected to the bus with its feeding connection, does not apply a voltage (PWM signal with 0% duty cycle) to the bus upon detected motion.

Thereto, the master, which is connected to the bus with its non-feeding connection, short-circuits the bus lines upon detected motion, whereby a voltage (PWM signal with 0% duty cycle) is not applied to the bus. This is possible because, as described above, the feeding circuit of the feeding master is current-limited.

In the idle state, that is no detection of a motion, the master, which is connected to a bus line with its feeding connection, applies a PWM signal with a duty cycle >0 to the bus. For this idle state, there are multiple possibilities:

The master applies a PWM signal of the smallest allowable pulse width to the bus, which results in the fact that all of the LEs, which are connected to this bus, do not generate light (off state). Thereby, the power consumption of the masters and the slaves is minimized in this standby operation because the energy required for the operation of the receiving devices in the slaves and in the masters as well as the signal generation in the feeding master is minimal.

The master applies a PWM signal with a larger than the smallest allowable pulse width to the bus. This state results in the fact that all LEs connected to this bus generate light with a presettable fixed value or generate an amount of light, which is proportional to the pulse width of the PWM signal (dimming state).

The motion sensors can be provided with a time control such that the corresponding control signal is applied to the respective bus over a presettable time.

What is claimed is:

1. A circuit assembly for operating at least one lighting means,
wherein the circuit assembly includes
a first master device,
a first slave device, and
a bus system with a first bus, to which the first master device and the first slave device are coupled;
wherein the first bus is designed as a two-wire line,
wherein the first master device has a first feeding connection feeding a first bus voltage of the first bus, the first feeding connection coupled to the first bus and adapted to apply a control signal in the form of the bus voltage to the first bus, wherein the first master device is coupled to a first voltage supply;
wherein the first slave device has a non-feeding slave connection, which is coupled to the first bus, wherein the first slave device includes a connection for at least one first lighting means, a second voltage supply as well as a slave read-out device for reading out the control signal on the first bus, wherein the slave read-out device includes a potential isolating device and the connection for the at least one first lighting means as well as the second voltage supply are provided on a side of the slave read-out device isolated in potential from the first bus,
wherein the first master device includes a first non-feeding master connection, which can be coupled to a further bus, wherein the first master device includes a master read-out device for reading out a control signal on the further bus, wherein the master read-out device includes a potential isolating device, and
wherein the first master device includes a connection for at least one second lighting means, wherein the connection for the at least one second lighting means is provided on a side of the master read-out device isolated in potential from the further bus.

2. The circuit assembly according to claim 1,
wherein the first feeding connection of the first master device is not designed isolated in potential from the first voltage supply.

3. The circuit assembly according to claim 1,
wherein each of the respective potential isolating devices includes an optical coupler.

4. The circuit assembly according to claim 3,
wherein the optical coupler includes an emitting diode and a phototransistor, wherein a current limiting device is coupled in series with the emitting diode.

5. The circuit assembly according to claim 1,
wherein the first feeding connection of the first master device includes a first current limiting device, which is disposed between the plus terminal of its voltage supply and the first bus or between the minus terminal of its voltage supply and the first bus.

6. The circuit assembly according to claim 5,
wherein the first feeding connection of the first master device includes a first diode and a second diode, wherein the first diode is coupled between a first connection of its voltage supply and a first line of the first bus and the second diode between a second connection of its voltage supply and a second line of the first bus, wherein the first and the second diode are arranged anti-parallel.

7. The circuit assembly according to claim 5,
wherein the first feeding connection of the first master device includes a second current limiting device, wherein a current limiting device is disposed between the minus terminal of its voltage supply and the bus and a current limiting device is disposed between the plus terminal of its voltage supply and the first bus.

8. The circuit assembly according to claim 1,
wherein the non-feeding slave connection or first non-feeding master connection includes a rectifier, which is disposed on the side of the potential isolating device coupled to the respective bus for rectifying the control signal on the respective bus.

9. The circuit assembly according to claim 1,
wherein the non-feeding slave connection or first non-feeding master connection respectively includes an evaluation device, which is adapted to evaluate the control signal on the respective bus, to which the respective non-feeding connection is coupled, the input of which is coupled to the respective potential isolating device on the side isolated in potential from the respective bus and the output of which is coupled to the respective lighting means, wherein the control signal is a PWM signal.

10. The circuit assembly according to claim 9,
wherein the evaluation device is adapted to convert the PWM signal as follows:
   a bus-controlled operation of the respective lighting means with nominal power or a nominal light flux is activated by a PWM signal with 0% pulse width; and
   a bus-controlled off state of the respective lighting means is activated by a PWM signal with a presettable smallest allowable pulse width; and
   bus-controlled operating modes with dimming stages between the off state and the nominal power or the nominal light flux are activated by a PWM signal with pulse widths, which are larger than the smallest allowable pulse width by a PWM signal with 100% pulse width.

11. The circuit assembly according to claim 1,
wherein the first master device includes a sensor, in particular a brightness sensor and/or a motion sensor, which is adapted to provide a sensor signal at its output, wherein the first master device is adapted to generate the control signal depending on the sensor signal.

12. A circuit assembly for operating at least one lighting means, wherein the circuit assembly includes
   a first master device,
   a first slave device, and
   a bus system with a first bus, to which the first master device and the first slave device are coupled;
      wherein the first bus is designed as a two-wire line,
      wherein the first master device has a first feeding connection feeding a first bus voltage of the first bus, the first feeding connection coupled to the first bus and adapted to apply a control signal in the form of the bus voltage to the first bus, wherein the first master device is coupled to a first voltage supply;
      wherein the first slave device has a non-feeding slave connection, which is coupled to the first bus, wherein the first slave device includes a connection for at least one first lighting means, a second voltage supply as well as a slave read-out device for reading out the control signal on the first bus, wherein the slave read-out device includes a potential isolating device and the connection for the at least one first lighting means as well as the second voltage supply are provided on the side of the slave read-out device isolated in potential from the first bus,
      wherein the first master device includes a first non-feeding master connection, which can be coupled to a further bus, wherein the first master device includes a master read-out device for reading out a control signal on the further bus, wherein the master read-out device includes a potential isolating device, wherein the first master device includes a connection for at least one second lighting means, wherein the connection for the at least one second lighting means is provided on a side of a master read-out device isolated in potential from the further bus, and
      wherein the first non-feeding connection of the first master device furthermore has a short-circuit device, which can be coupled to the further bus, wherein the short-circuit device includes a control input for applying a short-circuit signal and is adapted to short-circuit two lines of the further bus upon application of a short-circuit signal to its control input, wherein the short-circuit device includes a potential isolating device for isolating the potential of the control input from the potential of the further bus.

13. The circuit assembly according to claim 12,
wherein the circuit assembly includes:
   a second bus;
   a second master device with a second feeding connection and a second non-feeding master connection,
wherein at least the first feeding connection of the first roaster device is coupled to the first bus,
wherein the second feeding connection of the second master device is coupled to the second bus, wherein the second non-feeding master connection of the second master device is coupled to the first bus.

14. The circuit assembly according to claim 12,
wherein each of the respective potential isolating devices includes an optical coupler.

15. The circuit assembly according to claim 14,
wherein the optical coupler includes an emitting diode and a phototransistor, wherein a current limiting device is coupled in series with the emitting diode.

16. The circuit assembly according to claim 12,
wherein the first feeding connection of the first master device includes a first current limiting device, which is disposed between the plus terminal of its voltage supply and the first bus or between the minus terminal of its voltage supply and the first bus.

17. The circuit assembly according to claim 16,
wherein the first feeding connection of the first master device includes a first diode and a second diode, wherein the first diode is coupled between a first connection of its voltage supply and a first line of the first bus and the second diode between a second connection of its voltage supply and a second line of the first bus, wherein the first and the second diode are arranged anti-parallel.

18. The circuit assembly according to claim 16,
wherein the first feeding connection of the first master device includes a second current limiting device, wherein a current limiting device is disposed between the minus terminal of its voltage supply and the bus and a current limiting device is disposed between the plus terminal of its voltage supply and the first bus.

19. The circuit assembly according to claim 12,
wherein the non-feeding slave connection or first non-feeding master connection includes a rectifier, which is disposed on the side of the potential isolating device coupled to the respective bus for rectifying the control signal on the respective bus.

20. The circuit assembly according to claim 12,
wherein the non-feeding slave connection or first non-feeding master connection respectively includes an evaluation device, which is adapted to evaluate the control signal on the respective bus, to which the respective non-feeding connection is coupled, the input of which is coupled to the respective potential isolating device on the side isolated in potential from the respective bus and the output of which is coupled to the respective lighting means, wherein the control signal is a PWM signal.

21. The circuit assembly according to claim 20, wherein the evaluation device is adapted to convert the PWM signal as follows:
- a bus-controlled operation of the respective lighting means with nominal power or a nominal light flux is activated by a PWM signal with 0% pulse width; and
- a bus-controlled off state of the respective lighting means is activated by a PWM signal with a presettable smallest allowable pulse width; and
- bus-controlled operating modes with dimming stages between the off state and the nominal power or the nominal light flux are activated by a PWM signal with pulse widths, which are larger than the smallest allowable pulse width by a PWM signal with 100% pulse width.

22. The circuit assembly according to claim 12, wherein the first master device includes a sensor, in particular a brightness sensor and/or a motion sensor, which is adapted to provide a sensor signal at its output, wherein the first master device is adapted to generate the control signal depending on the sensor signal.

* * * * *